(12) United States Patent
Kling et al.

(10) Patent No.: US 10,568,470 B2
(45) Date of Patent: Feb. 25, 2020

(54) BATTERY COMPARTMENT, AN ELECTRONICALLY DRIVEN DISPENSING UNIT AND A DISPENSER

(71) Applicant: SCA Hygiene Products AB, Göteborg (SE)

(72) Inventors: Robert Kling, Skene (SE); Björn Henriksson, Lindome (SE); Håkan Timdahl, Partille (SE)

(73) Assignee: ESSITY HYGIENE AND HEALTH AKTIEBOLAG, Göteborg (SE)

( * ) Notice: Subject to any disclaimer, the term of this patent is extended or adjusted under 35 U.S.C. 154(b) by 0 days.

(21) Appl. No.: 15/524,047

(22) PCT Filed: Nov. 7, 2014

(86) PCT No.: PCT/SE2014/051322
§ 371 (c)(1),
(2) Date: May 3, 2017

(87) PCT Pub. No.: WO2016/072896
PCT Pub. Date: May 12, 2016

(65) Prior Publication Data
US 2017/0319020 A1    Nov. 9, 2017

(51) Int. Cl.
| A47K 10/36 | (2006.01) |
| H01M 2/10 | (2006.01) |
| H01M 2/20 | (2006.01) |
| A47K 10/32 | (2006.01) |

(52) U.S. Cl.
CPC ............ *A47K 10/36* (2013.01); *H01M 2/105* (2013.01); *H01M 2/204* (2013.01); *A47K 2010/3233* (2013.01); *A47K 2010/3246* (2013.01)

(58) Field of Classification Search
CPC .............................. H01M 2/105; H01M 2/204
USPC ......................................................... 221/258
See application file for complete search history.

(56) References Cited

U.S. PATENT DOCUMENTS

| 3,384,280 A | 5/1968 | Summersby |
| 4,206,274 A | 6/1980 | Peels |
| 4,269,908 A * | 5/1981 | Stemme .............. H01M 2/1044 429/100 |

(Continued)

OTHER PUBLICATIONS

First Chinese Office Action dated Jan. 23, 2019 issued in Chinese patent application No. 201480083205.9 (11 pages) and its English-language translation thereof (12 pages).

*Primary Examiner* — Rakesh Kumar
(74) *Attorney, Agent, or Firm* — Drinker Biddle & Reath LLP

(57) ABSTRACT

A battery compartment for an electronically driven dispensing unit includes an electronic unit having a fixed first structure and a battery holding unit having a fixed second structure adapted to receive and contain at least two cylindrical batteries side by side. The first structure includes a first electrical connection and a second electrical connection positioned opposite each other. The second structure is rotatably connected to the first structure via a joint allowing rotation between a first open position in which the batteries are loaded or unloaded in the battery holding unit and a closed position in which loaded batteries are connected to the first and second electrical connections via spring action and movement of the batteries in the loading direction.

20 Claims, 11 Drawing Sheets

(56) References Cited

U.S. PATENT DOCUMENTS

| | | | |
|---|---|---|---|
| 4,391,883 A | | 7/1983 | Williamson et al. |
| 5,212,020 A | * | 5/1993 | Inobe .................... G06F 1/1626 |
| | | | 429/123 |
| 5,337,215 A | * | 8/1994 | Sunderland ......... H01M 2/1055 |
| | | | 200/43.22 |
| 5,697,577 A | | 12/1997 | Ogden |
| 5,714,716 A | * | 2/1998 | Yamada .............. H01M 2/1044 |
| | | | 174/535 |
| 6,117,575 A | | 9/2000 | Dinsdale |
| 7,821,155 B2 | | 10/2010 | Reinsel et al. |
| 8,231,075 B2 | * | 7/2012 | Troutman .............. A47K 10/36 |
| | | | 242/595 |
| 8,555,761 B2 | * | 10/2013 | Keily ..................... B26D 1/125 |
| | | | 83/343 |
| 8,733,218 B2 | * | 5/2014 | Hansen .............. A47K 10/3643 |
| | | | 83/335 |
| 2003/0226853 A1 | | 12/2003 | Hidle et al. |
| 2005/0077419 A1 | | 4/2005 | Thomas et al. |
| 2005/0127090 A1 | | 6/2005 | Sayers et al. |
| 2009/0294521 A1 | * | 12/2009 | de la Huerga .......... A61J 1/035 |
| | | | 235/375 |
| 2011/0068129 A1 | | 3/2011 | Maurer |
| 2012/0167735 A1 | * | 7/2012 | Hansen .............. A47K 10/3643 |
| | | | 83/339 |
| 2017/0319020 A1 | * | 11/2017 | Kling ................. A47K 10/3625 |

\* cited by examiner

BATTERY COMPARTMENT, AN ELECTRONICALLY DRIVEN DISPENSING UNIT AND A DISPENSER

CROSS-REFERENCE TO PRIOR APPLICATION

This application is a § 371 National Stage Application of PCT International Application No. PCT/SE2014/051322 filed Nov. 7, 2014, which is incorporated herein in its entirety.

TECHNICAL FIELD

The disclosure relates to a battery compartment for an electronically driven dispensing unit arranged for use in a dispenser for hygiene product. The battery compartment includes an electronic unit having a fixed first structure and a battery holding unit having a fixed second structure adapted to, in a loading direction, receive at least two cylindrical batteries side by side. The fixed second structure is also adapted to contain in position the batteries in directions perpendicular to the loading direction. The first structure includes for each battery a first electrical connection and a second electrical connection positioned opposite each other. The first electrical connections are arranged on the same side of the compartment and the second electrical connections are arranged on the opposite side of the compartment. The electronic unit includes an electrical bridge extending between the first and second electrical connections for serial connection of the batteries. The first structure is adapted to receive the second structure and the batteries for connection with the first and second electrical connections.

BACKGROUND

Battery compartments and electronically driven dispensers for hygiene articles are known. For example, battery compartments where you put the batteries into a cavity having a spring on one side that has to be pushed back in order for the battery to fit into the cavity. Here, a person may find it hard to load the batteries in the battery compartment due to the spring action having to be overcome by hand force of the user. Furthermore, a person having bad eyesight may find it hard to understand what end of the battery should be positioned where, since this is normally marked with a readable plus and minus sign in the compartment. It is also common that batteries that are connected in series are loaded with every second battery oriented with its plus pole opposite its neighbor battery. This further increases the level of difficulty for loading the batteries. Yet furthermore, a dispenser for hygiene articles needs to be formed such that the handling of the hygiene articles are separate from handling of the machinery driving the dispenser in order to allow maximum hygiene of the articles.

Hence, there is a need for a battery compartment, an electronically driven dispensing unit and a dispenser that is simple and hygienic to use.

SUMMARY

The disclosure relates to a battery compartment adapted to an electronically driven dispensing unit that is adapted to a dispenser for hygiene articles. The battery compartment includes an electronic unit having a fixed first structure and a battery holding unit having a fixed second structure adapted to, in a loading direction, receive at least two cylindrical batteries side by side. The fixed second structure is also adapted to contain, in position, the batteries in directions perpendicular to the loading direction. Hence, the batteries are free to move in the loading direction, but hindered to move in all directions perpendicular to the loading direction, i.e. in the plane where the loading direction coincides with a normal vector of the plane. The first structure includes, for each battery, a first electrical connection and a second electrical connection positioned opposite each other. The first electrical connections are arranged on the same side of the compartment and the second electrical connections are arranged on the opposite side of the compartment. The electronic unit includes an electrical bridge extending between the first and second electrical connections for serial connection of the batteries. The first structure is adapted to receive the second structure and the batteries for connection with the first and second electrical connections. The second structure is rotatably connected to the first structure via a joint allowing rotation between a first open position in which the batteries are loaded or unloaded in the battery holding unit and a closed position in which loaded batteries are connected to the first and second electrical connections via spring action and movement of the batteries in the loading direction.

The joint has a rotational axis in a longitudinal direction. The loading direction is either in a radial direction perpendicular to the longitudinal direction or the loading direction coincides with the longitudinal direction.

The battery compartment could either be positioned in a bottom portion of a dispenser or a wall portion of the dispenser. The dispenser can be mounted onto a house wall with either the bottom portion against the house wall or with the wall portion against the wall. The orientation of the battery compartment depends on its position in the dispenser and how the dispenser is mounted to the house wall.

Should the battery compartment be positioned in the bottom portion when a wall portion of the dispenser is mounted onto a house wall, then the orientation of the batteries with relation to the joint would be such that the loading direction is in the radial direction perpendicular to the longitudinal direction. Here, the longitudinal direction is, at least partly, perpendicular to the direction of gravity and the loading direction, at least partly, coincides with the direction of gravity such that the batteries can be dropped into the battery holding unit by use of gravity force. The fixed second structure then contains, in position, the batteries in directions perpendicular to the loading direction.

Should the battery compartment be positioned in the bottom portion mounted onto a house wall or should the battery compartment be positioned in a wall portion mounted onto a house wall, then the orientation of the batteries with relation to the joint would be such that the loading direction coincides with the longitudinal direction. Here, the longitudinal direction would at least partly coincide with the direction of gravity such that the batteries can be dropped into the battery holding unit by use of gravity force. The fixed second structure then contains, in position, the batteries in directions perpendicular to the loading direction.

Hence, the loading direction either coincides with the direction of gravity or is arranged at an angle to the direction of gravity within the boundaries that the second structure should be able to contain the batteries in position from the loading position, i.e. the first open position, to the closed position. The rotational axis could be perpendicular to or coinciding with the direction of gravity, or could be arranged at an angle to the direction of gravity. Hence, the loading direction can coincide with the rotational axis, or be perpendicular to the rotational axis, or at an angle there between. However, the joint includes two members connected by one or more axles that allows for rotation between the first open position to the closed position. The second structure forms one of these members; or is mounted onto the member; or is part of the member, while the first structure forms the other member; or is mounted onto the other member; or is part of the other member.

Here, radial direction is a direction outwards from the joint. The joint has a rotational axis, hereinafter called the rotational axis, about which the battery holding unit rotates relative the fixed second structure, and the radial direction is perpendicular to the rotational axis. Hence, the radial direction follows the rotational movement of the battery holding unit, and the plane being perpendicular to the rotational axis rotates accordingly.

One advantage of embodiments of the invention is that the loading of the batteries is simple since a user simply drops, i.e. places, the batteries into the battery holding unit and then moves the entire battery holding unit from the open position to the closed position and the batteries will, due to the closing motion, simultaneously be connected to the first and second electrical connections. Another advantage is that since all first electrical connections are positioned on the same side and the electrical bridge allows for serial connection, a user simply positions all batteries in a similar fashion into the battery holding unit, i.e. with either the plus pole up or the minus pole up.

Normal batteries have one plus pole having a protrusion that can be easily identified and if all batteries should be positioned with a selected end of the batteries up or down, then it becomes very easy for a user to identify the end and then load all batteries in the same manner. This means that for a standard cylindrical battery with a protrusion on the plus side, a user can easily identify all batteries by the protrusion and load the batteries accordingly. According to one example, the first electrical connections are arranged on the same side of the compartment as the joint. According to one example, the first electrical connections are arranged for connection with the minus pole of the batteries. Hence, in this example the second electrical connections are arranged for connection with the plus pole of the batteries. However, the contrary is possible, i.e. that the first electrical connections are arranged for connection with the plus pole of the batteries. Hence, in this example, the second electrical connections are arranged for connection with the minus pole of the batteries.

According to one example, the battery holding unit includes a protrusion for each battery on which a bottom portion of the battery is arranged to rest in the first open position. The advantage of the protrusion is that batteries become securely positioned in a predetermined position in the loading direction so that the battery holding unit can be moved from the open position to the closed position with all batteries positioned in the same way, i.e. without any of them sticking out hindering closing. Furthermore, the protrusion also gives a signal to the user that the battery is in a correct place due to the fact that the battery cannot be pushed further. Another signal could be that the protrusion and battery are hard enough to give away a sound when the battery is dropped or forced into the battery holding unit and then hits the protrusion.

According to one example, the batteries are separated from connection with the first electrical connection in the first open position. One advantage is that short-circuit is avoided.

The closing of the battery holding unit and thus the fixed second structure could be described as including at least the open position for loading the batteries; a second open position, between the first open position and the closed position, where the bottom portion is in contact with the first electrical connection; a third open position, between the second open position and the closed position where a top portion of the battery is in contact with the second electrical connection, where the batteries are subject to spring forces between the first and second electrical connections during rotational movement of the second structure between the third open position and the closed position.

According to one example, each of the first electrical connections includes a spring exerting a force on the bottom portion of the battery causing the battery to move in the loading direction in a direction away from the protrusion during rotational movement from the second open position to the third open position. One advantage of using a spring is that the battery becomes under constant dynamic pressure from the spring towards the second electrical connection which ensures electrical connection.

According to one example, the second electrical connection includes an inclined surface on which the top portion of the battery rides during the rotation from the third open position to the closed position. The inclined surface increasingly exerts a force on the battery causing the battery to move in the loading direction in a direction towards the protrusion during rotational movement from the third open position to a fourth open position, between the third open position and the closed position, or during rotational movement from the third open position to the closed position. The movement in the loading direction depends on whether the second electrical connection is inclined along the entire rotational path of the battery or only a part of the way. Should the second electrical connection have an inclined surface only during part of the rotational path, then the inclined surface increasingly exerts a force on the battery causing the battery to move in the loading direction in a direction towards the protrusion during rotational movement from the third open position to the fourth open position. Should the second electrical connection have an inclined surface during the entire rotational path, the inclined surface increasingly exerts a force on the battery causing the battery to move in the loading direction in a direction towards the protrusion during rotational movement from the third to the closed position. However, the movement in the loading direction depends not only on the form of the second electrical connection, but also on the form of the top portion of the battery. If the top portion is flat, then the edge of the top portion rides on the second electrical connection until the flat portion comes in contact with the second electrical connection. If the top portion is flat with a protrusion according to the above, then the edge of the top portion rides on the second electrical connection until the protrusion comes in contact with the second electrical connection. Hence, the form/shape of the top portion interacts with the form/shape of the second electrical connection and the form/shape of the two is a design choice dependent on desired motion of the battery in the loading direction. The geometrical relationship between the surfaces and corresponding movement of the battery during rotation is known per se and will therefore not be explained further in the application.

According to one example, the batteries are suspended between the first and second electrical connections in the closed position and at a distance from the protrusion. One advantage of having the battery suspended is that electric contact is maintained even during motion of the battery compartment since the spring takes up forces being a consequence of the motion. According to one example, also the second electrical connection includes spring means for improved suspension of the batteries.

According to one example, the fixed second structure includes an enclosing structure allowing loading and unloading movement of the batteries in the loading direction and being adapted to contain the batteries in the directions being perpendicular to the loading direction.

According to one example, the enclosing structure includes one enclosing unit per battery that separates the batteries. The enclosing structure includes a gap between the enclosing units. The electrical bridge is advantageously positioned in the gap in the closed position. One advantage is that the enclosing structure protects the electrical bridge from coming into contact with the batteries which could cause short-circuit.

According to one example, the battery holding unit is arranged such that gravity holds the batteries in place in the loading direction when the battery holding unit is in the open position(s). This has the advantage of allowing the user to simply drop the batteries in place without any other means for hindering from falling out than the structure of battery holding unit itself and the gravity.

The disclosure also relates to an electronically driven dispensing unit for hygiene articles including a battery compartment according to any one of the above described embodiments. A dispensing unit for hygiene articles is positioned in homes, hospitals, restaurants, public places, etc. and handled by many different users with skills/abilities ranging from very low to very high. It is therefore crucial that the battery compartment allows for simple and intuitive handling when it comes to battery change, so that anybody can switch batteries for the dispensing unit to work properly. One advantage of using a battery compartment according to the above with said dispensing unit is that it allows for such simple and intuitive handling.

Furthermore, the disclosure also relates to a dispensing unit being an insert for a dispenser. An insert is a removable device that can be attached to one or more devices to form a complete unit such as an electronically driven dispenser for hygiene articles. If the dispensing unit is not an insert, it is a fixed part of the dispenser.

The dispensing unit, being a fixed part or an insert, includes a drive mechanism including an electric motor connected to and driven by the batteries. The dispensing unit includes a control unit for controlling the drive mechanism. The dispensing unit includes a feeding unit connected to the driving mechanism for dispensing a hygiene article. The dispensing unit includes a first housing portion having a bottom portion and four side walls forming a compartment.

The battery holding unit includes a lid with an upper surface facing away from the second structure. The upper surface of the lid is arranged with relation to the joint to lay flush with an upper surface of the bottom portion or an upper surface of one of the side walls in the closed position. One advantage of the lid being flush with the upper surface is that the compartment becomes easy to keep clean due to the even surface.

As mentioned before, the loading direction is either in the radial direction perpendicular to the longitudinal direction or the loading direction coincides with the longitudinal direction. Should the loading direction be in the radial direction perpendicular to the longitudinal direction, then the upper surface of the lid will lay flush with the upper surface of the bottom portion. Should the loading direction coincide with the longitudinal direction, then the upper surface of the lid will lay flush with the upper surface of any one of the side walls. However, should the bottom portion be mounted onto a wall, then the battery holding unit will be arranged such that the loading direction coincides with the longitudinal direction and the upper surface of the lid will lay flush with the upper surface of bottom portion. The following examples refer to the bottom portion or wall dependent on the orientation of the loading direction according to the above.

It should be noted that the bottom portion surface or the wall surface may be flat and two dimensional, but may also be flat and three dimensional, i.e. curved in a U like shape. Other three dimensional and curved shapes are possible, but regardless of shape of the bottom portion, the lid and corresponding joint is always positioned to allow for a flush transition from the lid to the bottom portion or wall.

Should the bottom portion surface or wall surface be flat and two dimensional, it is herein described as a plane. If the bottom portion surface or wall surface is a plane, then the surface of the lid is flat and two dimensional, i.e. also a plane, and in the closed position the radial direction lies in the plane or parallel with the plane. The radial direction always lies in the plane or parallel with the plane.

According to one example, the joint is positioned at an underside of the lid, i.e. under the upper surface of the lid, and below the upper surface of the bottom portion or the upper surface of the wall. This has the advantage of allowing the joint to be hidden so that the joint does not form a protrusion in the compartment.

The joint is made from at least two parts that are connected to each other to allow rotation about an axis. According to one example, the first and second structures are directly connected to each other via a bearing arrangement including an axle and a corresponding bearing surface.

According to another example, the first and second structures are indirectly connected to each other via a bearing arrangement including an axle and a corresponding bearing surface in which the axle is mounted. According to one example, the axle is positioned in the battery holding unit in connection to the lid and the corresponding bearing surface is positioned in the bottom portion or wall of the compartment in the dispensing unit. The first structure is attached to an underside of the bottom portion or wall of the compartment or is a part of the bottom portion or wall and positioned on the underside. Hence, the first and second structures are indirectly connected to each other via the axle and the corresponding bearing surface in the bottom portion or wall being connected to the first structure. The axle runs along the entire lid to protrude on each side and mounted in two bearing surfaces. It should be noted that the axle could be divided into two axles connected to either side of the lid and protruding from said lid and mounted in two bearing surfaces. According to one example, the corresponding bearing surfaces are part of the bottom portion or wall of the compartment in the form of indentations that receive the axles. The indentations could be essentially semicircular in their respective cross-section for allowing the axles to be mounted by positioning the axles in the indentation and pressing the lid towards the indentations until the axles are fully engaged in the indentations. The cross section of the indentations could be fuller than a half circle and less full than a full circle to allow for a locking effect of the indentation about the axles after having been mounted. In another example, the axles are mounted in bearing surfaces that are circular in their cross sections and positioned in or under the bottom portion or wall of the compartment.

According to one example, the second structure is directly attached to the underside of the lid. One advantage is a compact and strong structure where the lid is part of the reinforcement for the second structure.

According to one example, the feeding unit includes a drive roller for dispensing sheet material. The drive roller is connected to the drive mechanism and controlled by the control unit. The sheet material is a tissue towel or napkin.

Should the hygiene article be sheet material, then the compartment may be designed to fit a stub roll for allowing automatic transition from an almost finished roll of sheet material, i.e. the stub roll, to a fresh roll of hygiene articles positioned in a hygiene article compartment described below in connection to the description of the dispenser. This type of arrangement is known per se in the field.

In another example, the feeding unit may include a pump for pumping hygiene liquid.

As mentioned above, the disclosure also relates to a dispenser for hygiene articles including a battery compartment according to the above or a dispensing unit according to the above including such a battery compartment. The dispenser includes a second housing portion including a hygiene article compartment for storing hygiene articles. The hygiene article compartment is typically formed to allow refill of the hygiene articles.

According to one example, the first housing portion and the second housing portion are connected to each other forming a continuous dispenser housing.

The dispenser housing can be opened and closed to allow for refill of hygiene articles. There can be a door in the housing, or the first and second housing portions may be disconnected to allow access to the hygiene article compartment. According to one example, access to the battery compartment is possible only when the dispenser housing is open.

According to one example, the battery compartment is connected to and part of the dispenser housing such that at least a part of the battery compartment is accessible from the outside of the dispenser housing. According to one example, when the battery compartment is accessible from the outside, the battery compartment includes a lock for locking the battery compartment and thereby hindering access to the battery compartment. One advantage is that easy theft of the batteries is hindered.

In the closed position, the battery holding unit, and thus the fixed second structure, is held in place by a locking mechanism. The locking mechanism has a first locking portion in the battery holding unit and a second locking portion in connection to the fixed first structure. The second locking portion is either part of the fixed first structure or part of a different portion of the dispensing unit being secured in fixed relationship to the fixed first structure. According to one example, the locking mechanism includes audible means for producing an audible sound that tells the user closing the battery compartment that the battery holding unit is secured in place in the closed position. Such audible means are known per se for a person skilled in the art and may be in the form of a resilient member that snaps into position with an audible click. According to another example, the battery box includes visible means that lights up when the batteries are connected, i.e. when the battery holding unit is in the closed position. The visible means 44 may be an integral part of the battery box or may be connected to a visible device in the dispensing unit and/or the dispenser.

BRIEF DESCRIPTION OF DRAWINGS

Embodiments of the invention will below be described in connection to a number of drawings, in which:

FIG. 10 schematically shows a perspective view of a dispenser including a battery compartment according to FIGS. 1-6 and an electronically driven dispensing unit for hygiene articles according to FIGS. 7-9, and wherein:

DETAILED DESCRIPTION OF PARTICULAR EMBODIMENTS

In the figures, like items are denoted with the same numbers.

Figure 1:
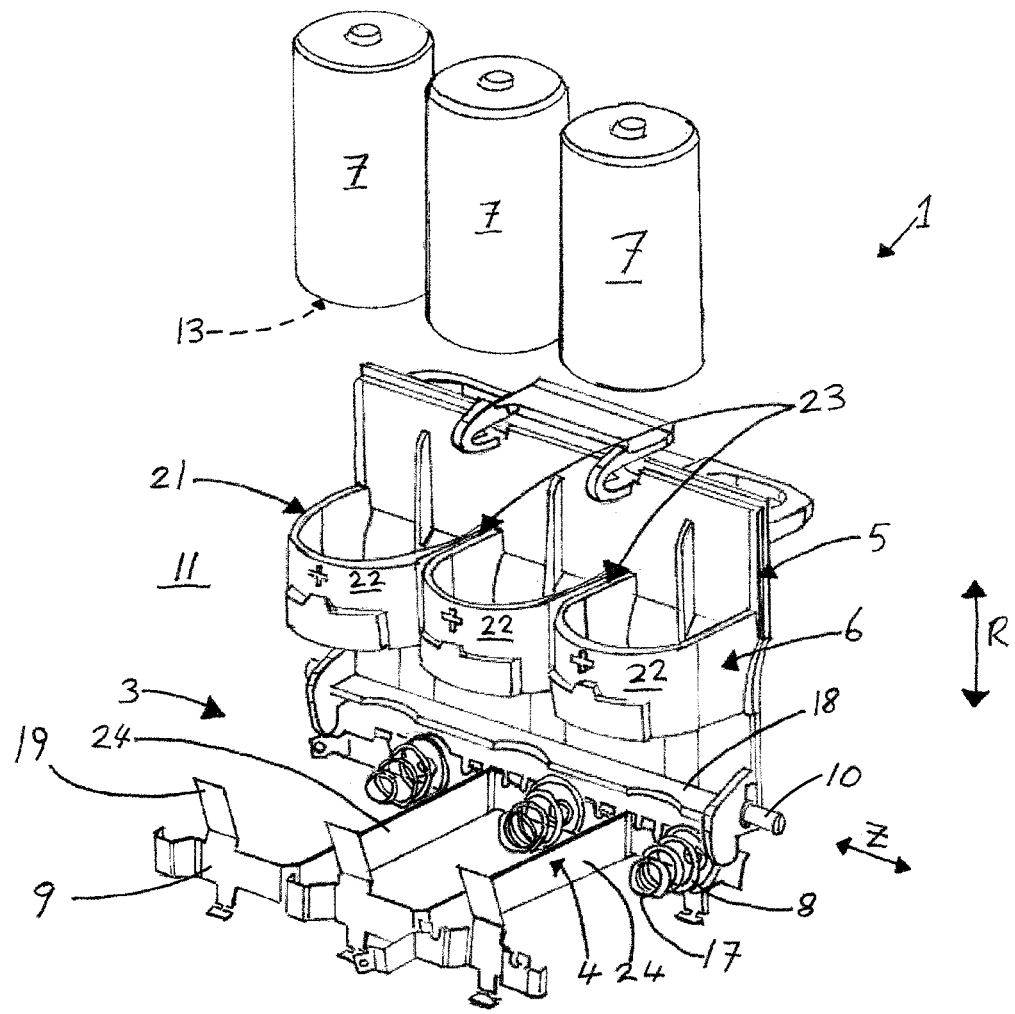
FIG. 1 schematically shows a perspective view of a battery compartment in an open position.
Figure 2:
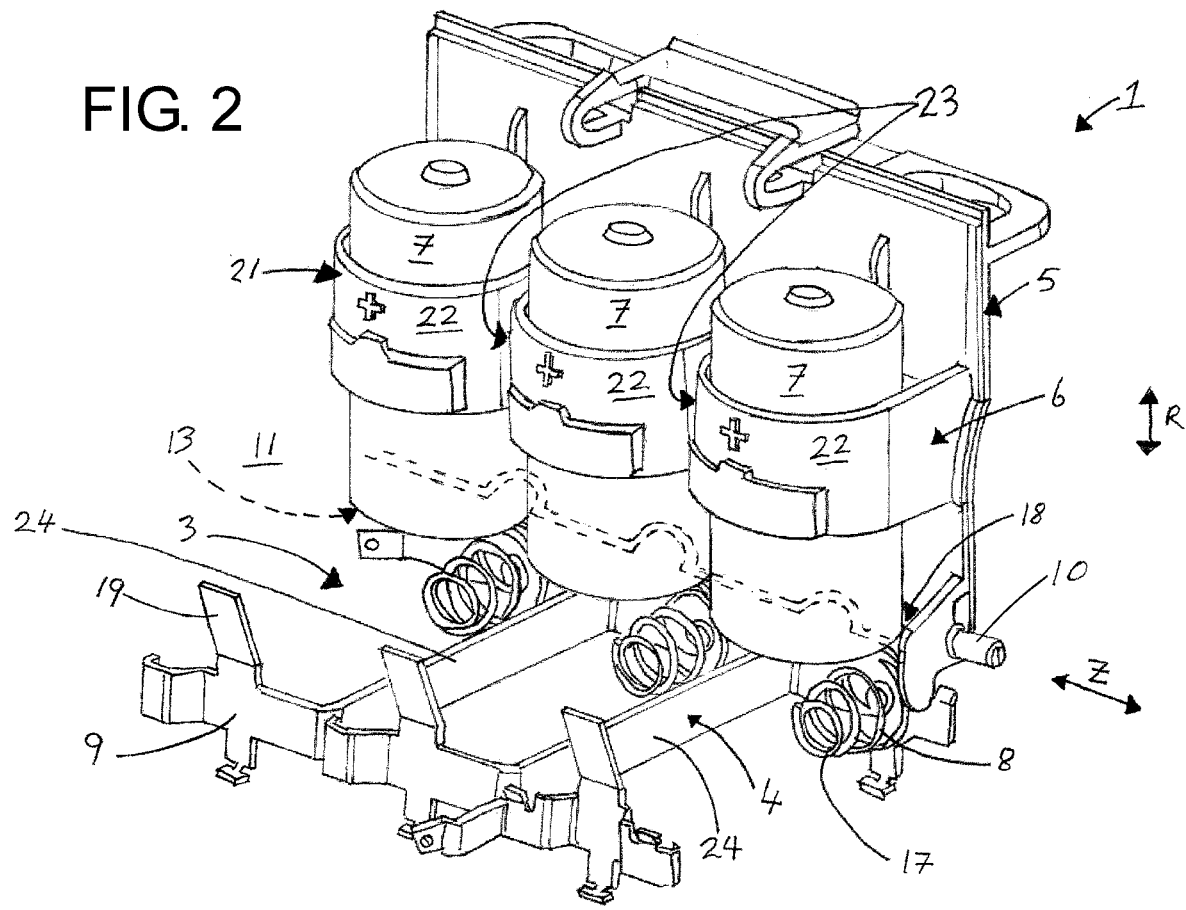
FIG. 2 schematically shows a perspective view of a battery compartment according to FIG. 1, with batteries loaded.
Figure 3:
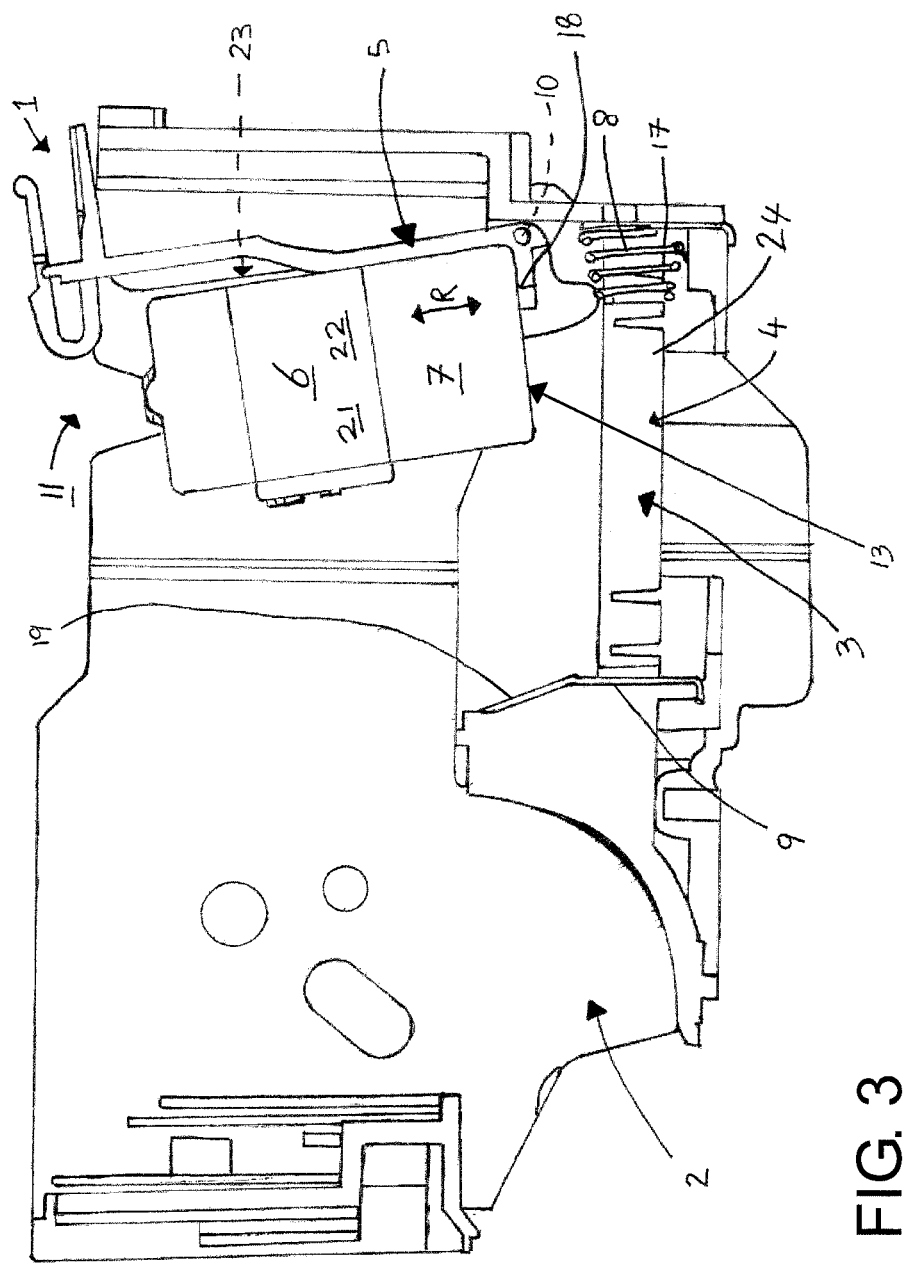
FIG. 3 schematically shows a side view of FIG. 2.
Figure 4:
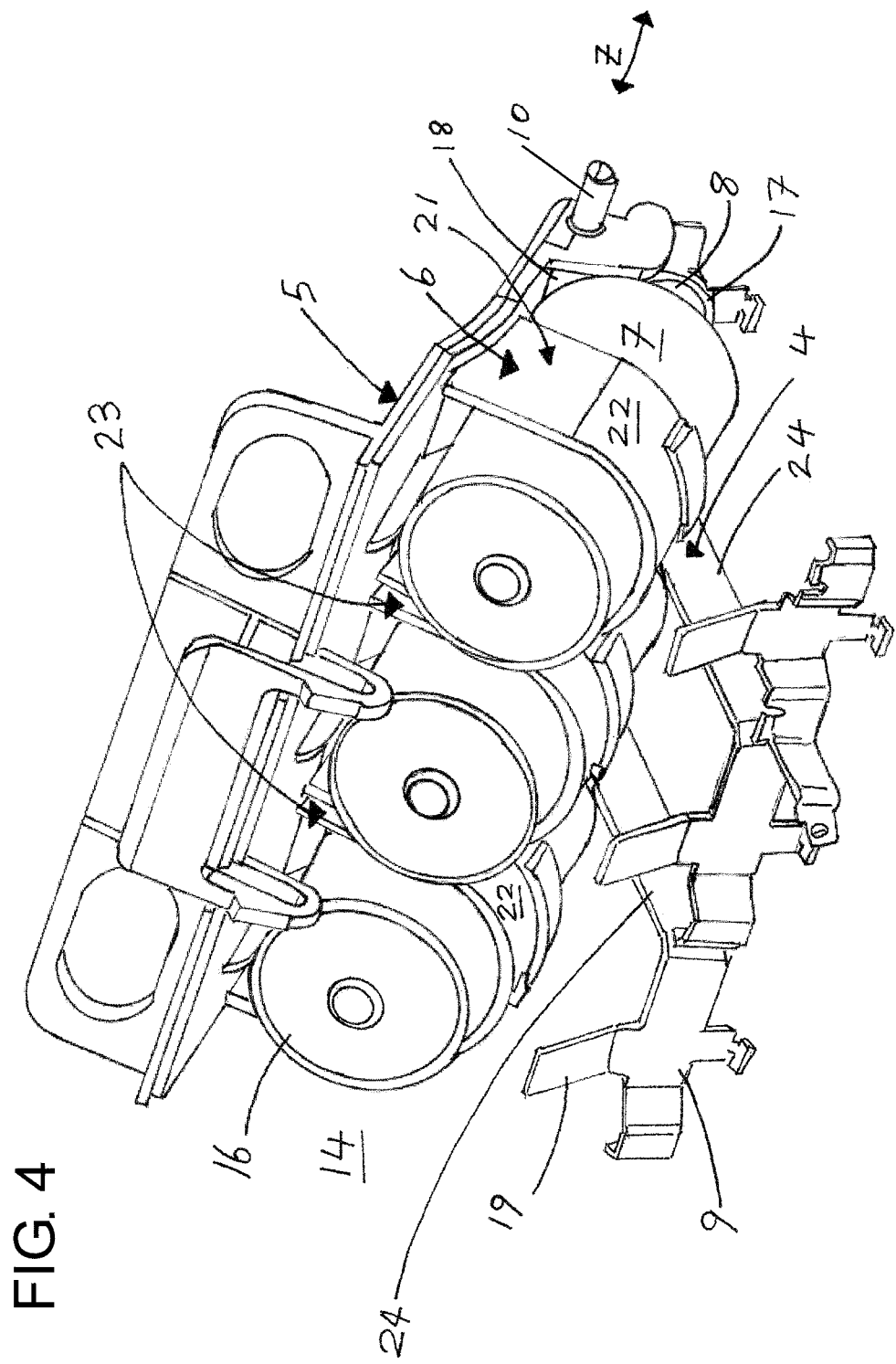
FIG. 4 schematically shows a perspective view of a battery compartment according to FIGS. 1-3, in a second open position.
Figure 5:
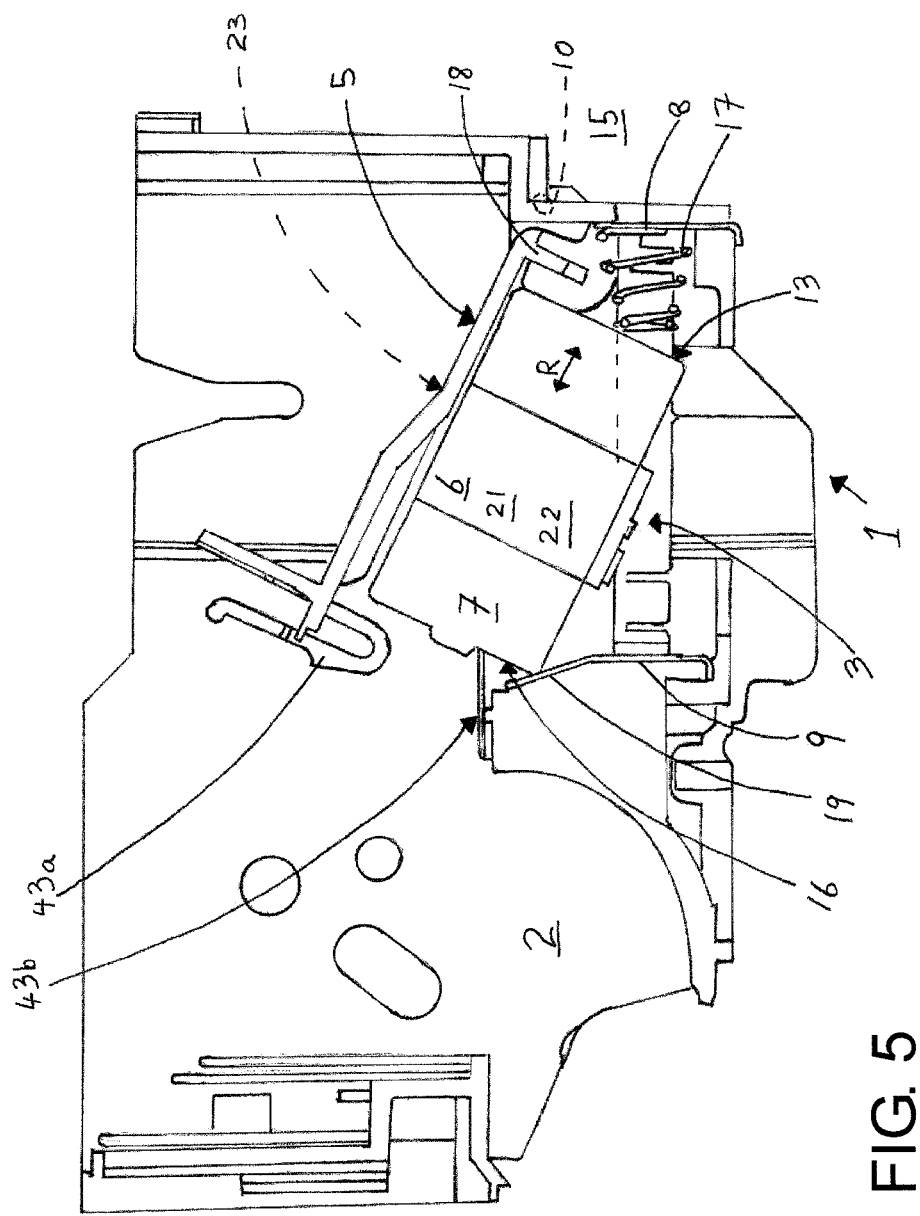
FIG. 5 schematically shows a side view of a battery compartment according to FIGS. 1-4, in a third open position.
Figure 6:
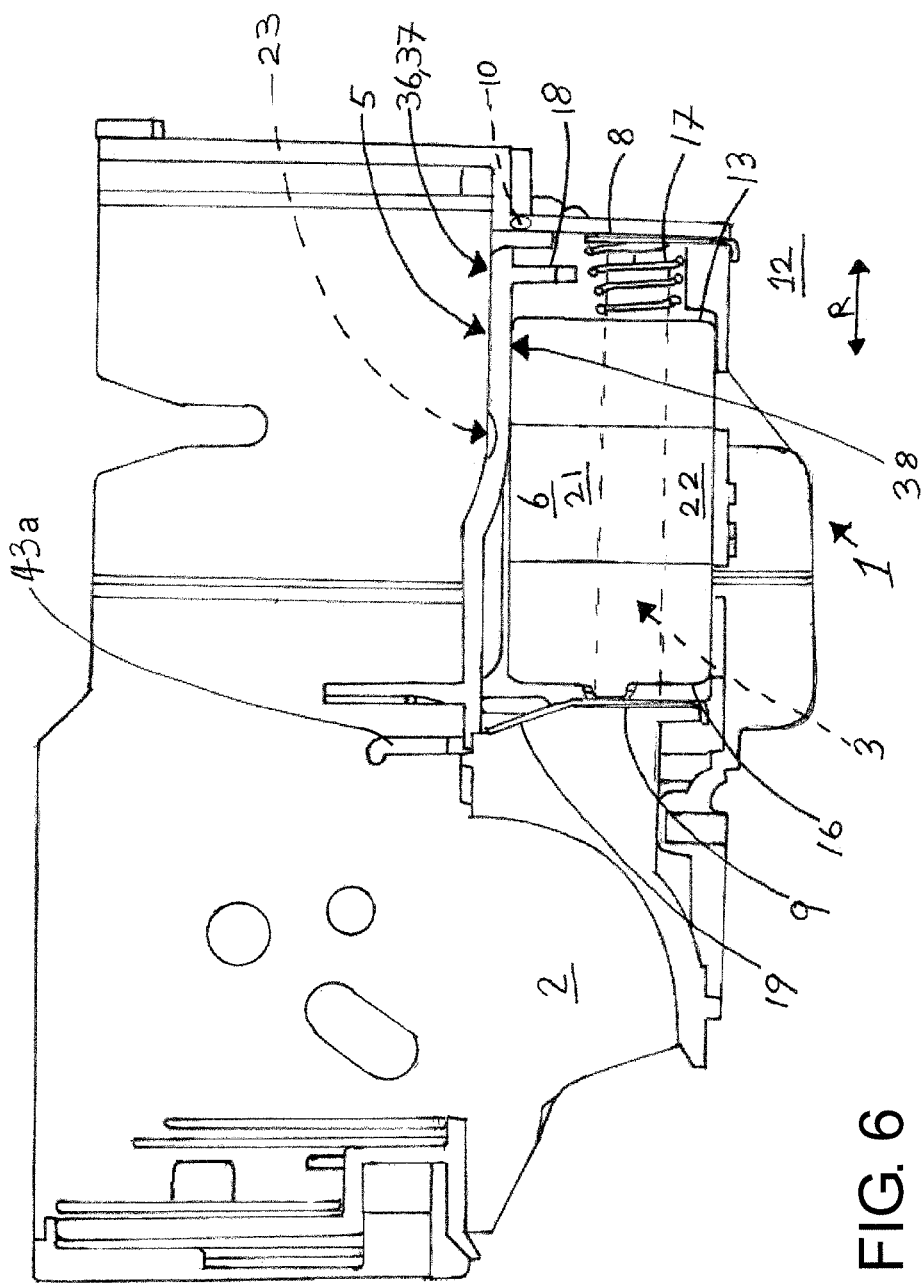
FIG. 6 schematically shows a side view of a battery compartment according to FIGS. 1-5, in a closed position.

FIGS. 1-6 schematically show perspective views of a battery compartment 1 in different positions. FIG. 1 shows a battery compartment in an open position. FIG. 1 is identical to FIG. 2 except that in FIG. 2 batteries are loaded and in FIG. 1 they are not. FIG. 3 shows a side view of FIG. 2. FIG. 4 schematically shows a perspective view of a battery compartment according to FIGS. 1-3, in a second open position. FIG. 5 schematically shows a side view of a battery compartment according to FIGS. 1-4, in a third open position. FIG. 6 schematically shows a side view of a battery compartment according to FIGS. 1-5, in a closed position. The different positions will be explained below.

Figure 7:
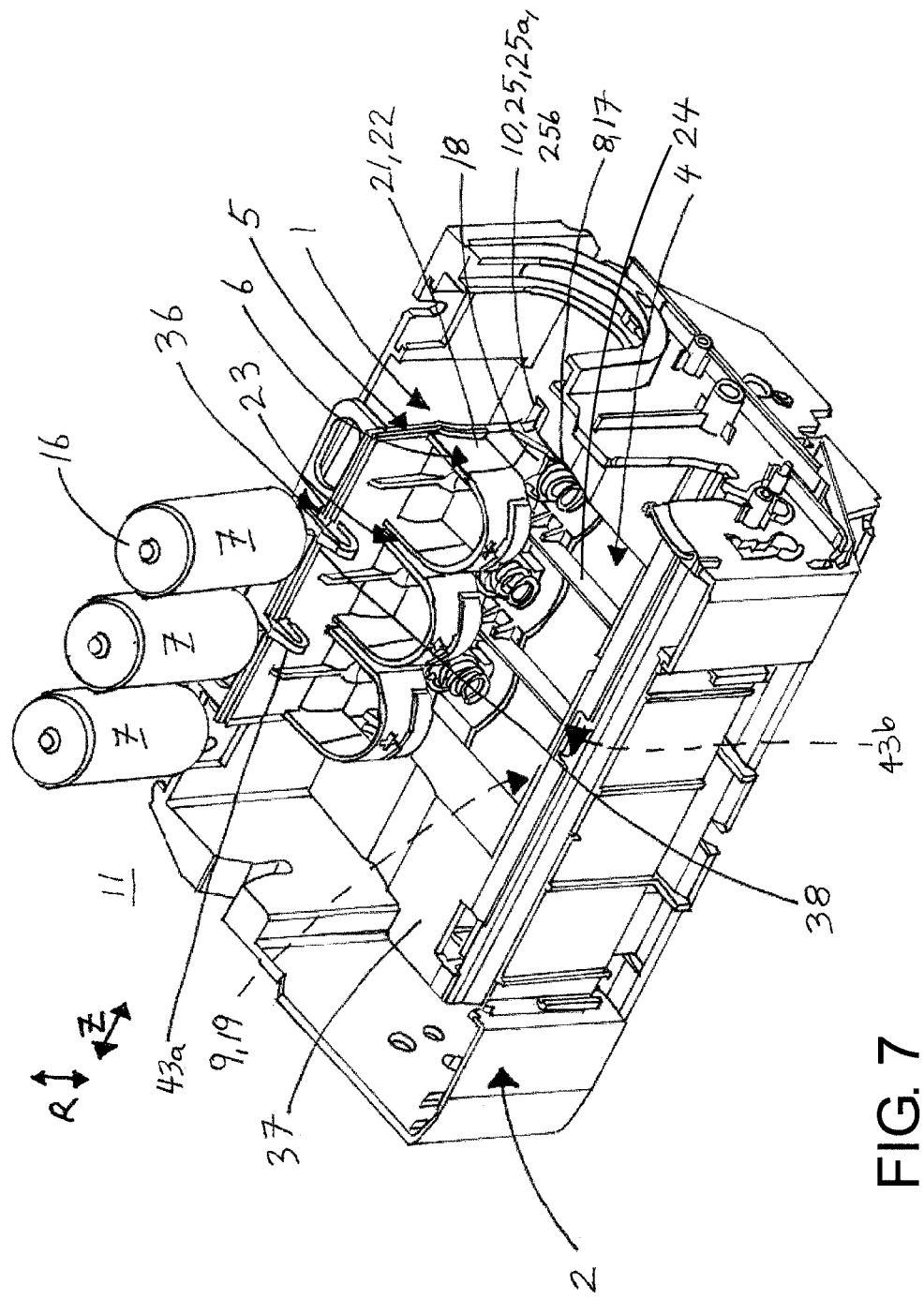
FIG. 7 schematically shows a perspective view of an electronically driven dispensing unit for hygiene articles including a battery compartment according to FIGS. 1-6, where the battery compartment is in an open position according to FIG. 1.
Figure 8:
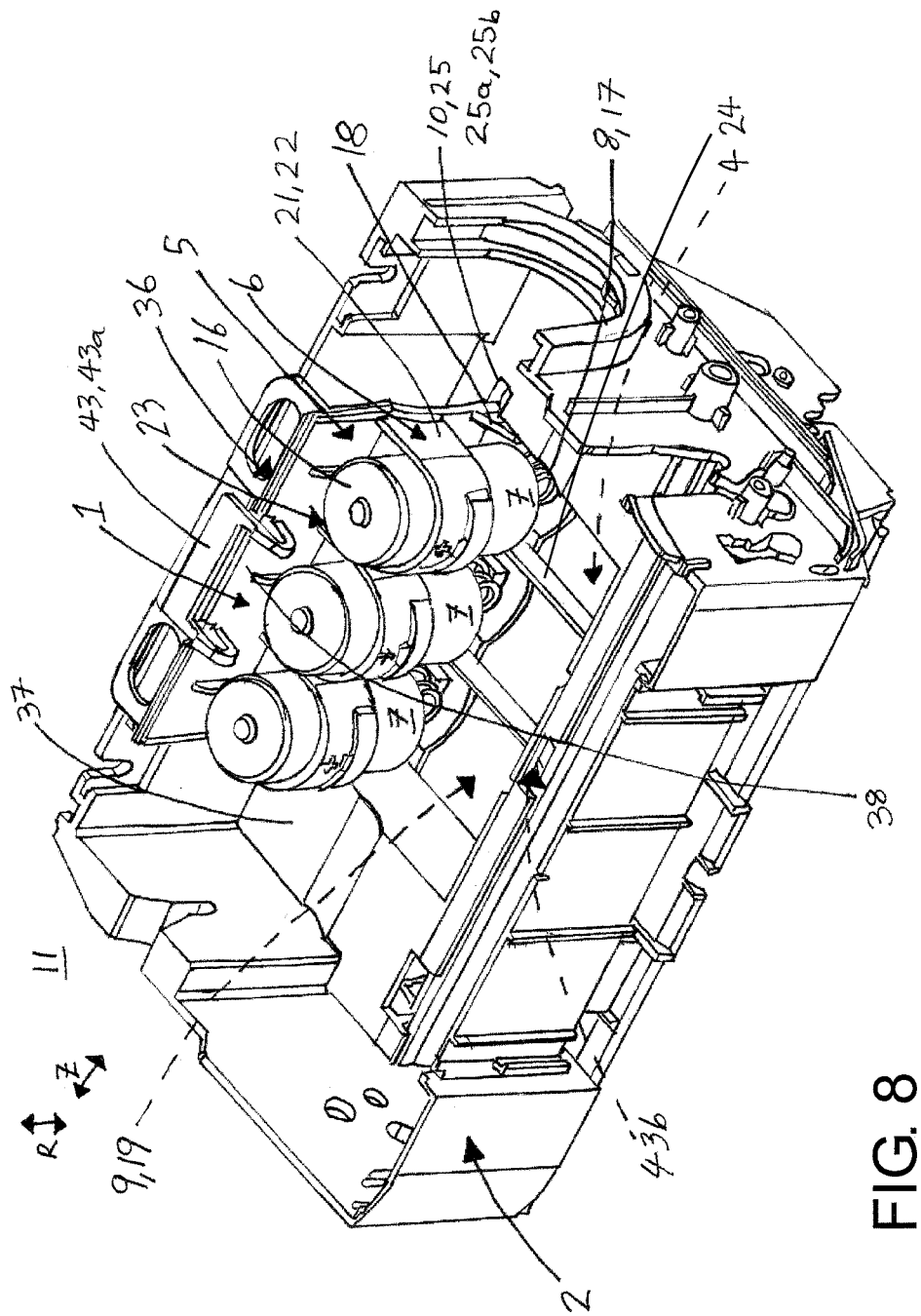
FIG. 8 schematically shows a perspective view of an electronically driven dispensing unit for hygiene articles including a battery compartment according to FIGS. 1-6, where the battery compartment is in an open position with batteries loaded according to FIG. 2.
Figure 9:
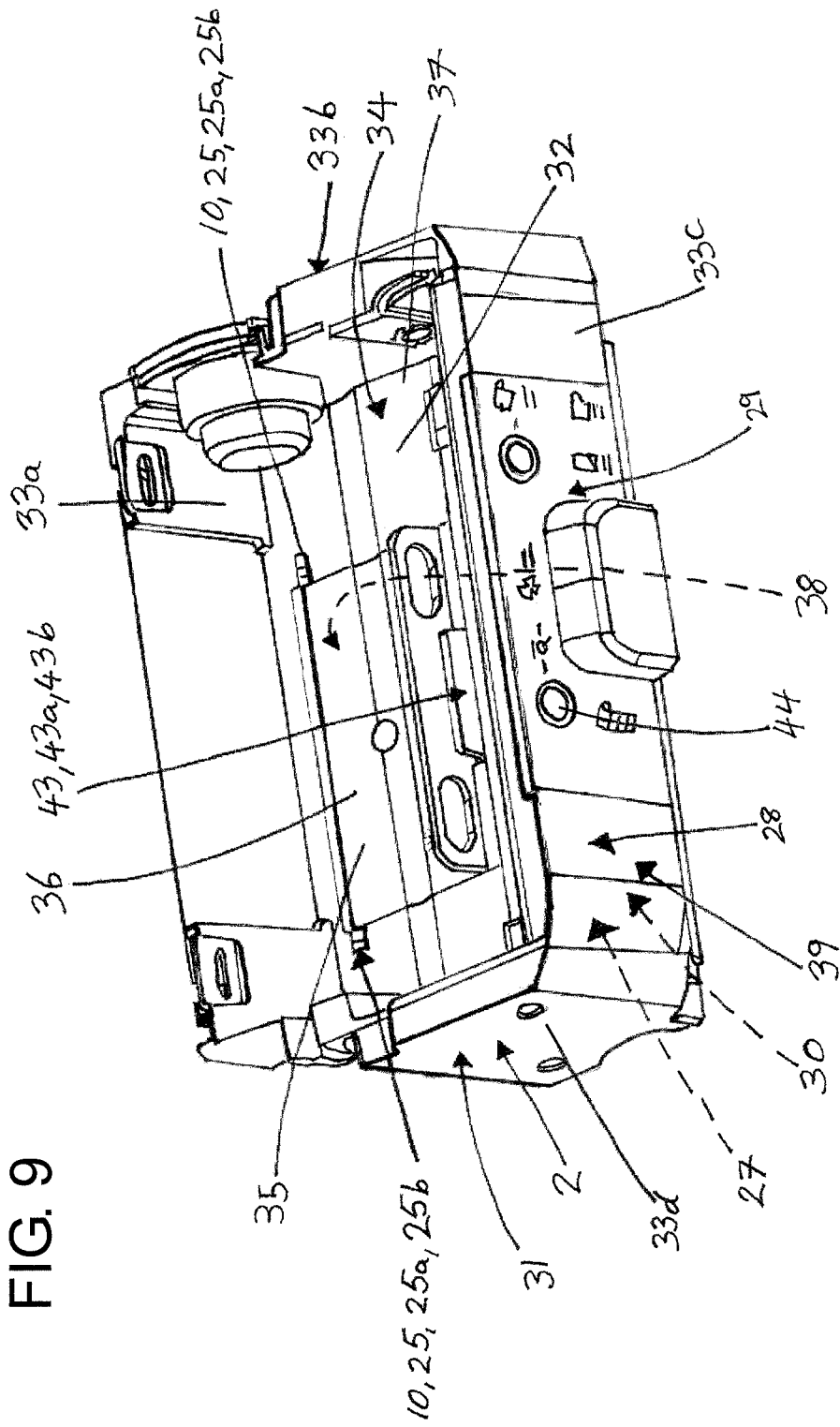
FIG. 9 schematically shows a perspective view of an electronically driven dispensing unit for hygiene articles including a battery compartment according to FIGS. 1-6, where the battery compartment is in a closed position according to FIG. 6.

FIGS. 1-6 show a battery compartment 1 for an electronically driven dispensing unit 2, in FIGS. 7-9. The battery compartment 1 includes an electronic unit 3 having a fixed first structure 4 and a battery holding unit 5 having a fixed second structure 6 adapted to, in a loading direction R, receive at least two cylindrical batteries 7 in parallel and, in directions perpendicular to the radial direction R, contain in position the batteries 7. The first structure 4 includes for each battery a first electrical connection 8 and a second electrical connection 9 positioned opposite each other. The first structure 4 is adapted to receive the second structure 6 and the batteries 7 for connection with the first and second electrical connections 8, 9. The second structure 6 is rotatably connected to the first structure 4 via a joint 10 allowing rotation between the first open position 11, FIGS. 1-3, in which the batteries 7 are loaded or unloaded in the battery holding unit 5 and a closed position 12, see FIG. 6, in which loaded batteries 7 are connected to the first and second electrical connections 8, 9 via spring action and movement of the batteries in the loading direction R.

The joint 10 has a rotational axis in a longitudinal direction Z. In FIGS. 1-10 the loading direction is a radial direction R perpendicular to the longitudinal direction Z and in FIG. 11 the loading direction R coincides with the longitudinal direction Z.

In FIGS. 1-6, the first electrical connections 8 are arranged on the same side of the compartment 1 as the joint 10.

In FIGS. 1-6, the battery holding unit 5 includes a protrusion 18 for each battery 7 on which a bottom portion 13 of the battery 7 is arranged to rest in the first open position 11, see FIGS. 2-3.

FIG. 4 schematically shows a perspective view of a battery compartment according to FIGS. 1-3, in the second open position. The second open position 14 is between the first open position 11 in FIGS. 1-3, and the closed position 12 in FIG. 6. FIG. 4 shows that in the second open position 14, the bottom portion 13 of the battery 7 is in contact with the first electrical connection 8.

FIG. 5 schematically shows a side view of a battery compartment according to FIGS. 1-4, in the third open position. The third open position 15 is between the second open position 14 in FIG. 4 and the closed position 12 in FIG. 6. FIG. 5 shows that in the third open position, a top portion 16 of the battery 7 is in contact with the second electrical connection 9. In the third open position 15, the batteries 7 are subject to spring forces between the first and second electrical connections 8, 9 during rotational movement of the second structure 6 between the third open position 15 in FIG. 5 and the closed position 12 in FIG. 6.

According to FIGS. 1-6, each of the first electrical connections 8 includes a spring 17 exerting a force on the bottom portion 13 of the battery 7 causing the battery 7 to move in the radial direction R in a direction away from the protrusion 18 during rotational movement from the second open position 14 to the third open position 15.

The second electrical connection 9 includes an inclined surface 19 on which the top portion 16 of the battery rides during the rotation from the third open position 15 to the closed position 12, wherein the inclined surface 19 increasingly exerts a force on the battery 7 causing the battery 7 to move in the radial direction R in a direction towards the protrusion 18 during rotational movement from the third open position 15 to a fourth open position 20, between the third open position 15 and the closed position 12, or during rotational movement from the third open position 15 to the closed position 12. During the rotation, the inclined surface 19 increasingly exerts a force on the battery 7, which also causes the spring 17 to contract. The contraction starts from a position when the battery 7 comes into contact with the spring 17 to the fourth open position 20 or the closed position 12. If the second electrical connection 9 includes an inclined surface 19 also between the fourth open position 20 and the closed position 12, then the inclined surface 19 increasingly exerts a force on the battery 7 causing the battery 7 to move in the radial direction R in a direction towards the protrusion 18 during rotational movement from the fourth open position 20 to the closed position 12. Should the second electrical connection 9 not include an inclined surface 19 between the fourth open position 20 and the closed position 12, then no force would be exerted. FIG. 6 shows that the batteries 7 are suspended between the first and second electrical connections 8, 9 at a distance from the protrusion 18 in the closed position 12.

FIGS. 1-6 shows that the fixed second structure 6 includes an enclosing structure 21 allowing loading and unloading movement of the batteries 7 in the radial direction R and adapted to contain the batteries 7 in the directions being perpendicular to the radial direction R.

The enclosing structure 21 includes one enclosing unit 22 per battery 7 that separates the batteries 7. The enclosing structure 21 includes a gap 23 between the enclosing units 22. The electronic unit 3 includes an electrical bridge 24 extending between the first and second electrical connections 8, 9 for serial connection of the batteries. The electrical bridge 24 is positioned in the gap 23 in the closed position 12.

FIGS. 1-3 shows that the batteries 7 are separated from connection with the first electrical connections 8 in the first open position 11 due to the protrusion 18.

FIGS. 1-6 shows that the first electrical connections 8 are arranged for connection with the minus pole of the batteries 7.

The battery holding unit 5 is arranged such that gravity holds the batteries 7 in place in the radial direction R when the battery holding unit 5 is in the open position(s).

FIGS. 7-9 shows an electronically driven dispensing unit 2 including a battery compartment 1 according to any one of FIGS. 1-6. The dispensing unit 2 is either an insert for a dispenser 26 according to FIG. 10 or a fixed part of such a dispenser 26.

FIG. 7 schematically shows perspective view of an electronically driven dispensing unit 2 for hygiene articles including a battery compartment 1 according to FIGS. 1-6, where the battery compartment 1 is in an open position 11 according to FIG. 1.

FIG. 8 schematically shows perspective view of an electronically driven dispensing unit 2 for hygiene articles including a battery compartment 1 according to FIGS. 1-6, where the battery compartment 1 is in an open position 11 with batteries 7 loaded according to FIG. 2.

FIG. 9 schematically shows perspective view of an electronically driven dispensing unit 1 for hygiene articles comprising a battery compartment 1 according to FIGS. 1-6, where the battery compartment is 1 in a closed position 12 according to FIG. 6.

The dispensing unit 2 includes a drive mechanism 27 including an electric motor 28 connected to and driven by the batteries 7. The dispensing unit 2 includes a control unit 29 for controlling the drive mechanism 27. The dispensing unit 2 includes a feeding unit 30 connected to the driving mechanism 27 for dispensing a hygiene article. The dispensing unit 2 includes a first housing portion 31 having a bottom portion 32 and four side walls 33a, 33b, 33c, 33d forming a compartment 34. The battery holding unit 5 includes a lid 35 with an upper surface 36 facing away from the second structure 6. As can be seen in FIG. 9, the upper surface 36 of the lid 35 is arranged with relation to the joint 10 to lay flush with an upper surface 37 of the bottom portion 32 in the closed position.

FIGS. 7-9 shows that the joint 10 is positioned at an underside 38 of the lid 35 and below the upper surface 37 of the bottom portion 32. The second structure 6 is directly attached to the underside 38 of the lid 35.

The first and second structures 4, 6 are indirectly connected to each other via a bearing arrangement 25 including an axle 25a and a corresponding bearing surface 25b in which the axle 25*a* is mounted. The axle 25 is positioned in the battery holding 5 unit in connection to the lid 35 and the corresponding bearing surface 25*b* is positioned in the bottom portion 32 of the compartment 34 in the feeding unit 30. The first structure 4 is attached to an underside of the bottom portion 32 of the compartment 34 or is a part of the bottom portion 32 and positioned on the underside. Hence, the first and second structures 4, 6 are indirectly connected to each other via the axle 25*a* in the lid 35 and the corresponding bearing surface 25*b* in the bottom portion 32 being connected to the first structure 4. In FIGS. 7-9, the axle 25*a* is divided into two axles connected to either side of the lid 35 and protruding from said lid 35 and mounted in two bearing surfaces 25*b*. It should be noted that as an alternative (not shown), the axle 25*a* runs along the entire lid 25*a* to protrude on each side and mounted in two bearing surfaces 25*b* in the bottom portion 32. In FIGS. 7-9, the corresponding bearing surfaces 25*b* are part of the bottom portion 32 of the compartment 34 in the form of indentations that receive the axles 25*a*. The indentations could be essentially semi-circular in their respective cross-section for allowing the axles 25*a* to be mounted by positioning the axles 25*a* in the indentation and pressing the lid 35 towards the indentation until the axles are fully engaged in the indentations. The cross section of the indentations could be fuller than a half circle and less full than a full circle to allow for a locking effect of the indentation about the axles 25*a* after having been mounted. As an alternative (not shown), the axles are mounted in bearing surfaces that are circular in their cross sections and positioned in or under the bottom portion of the compartment.

Figure 10:
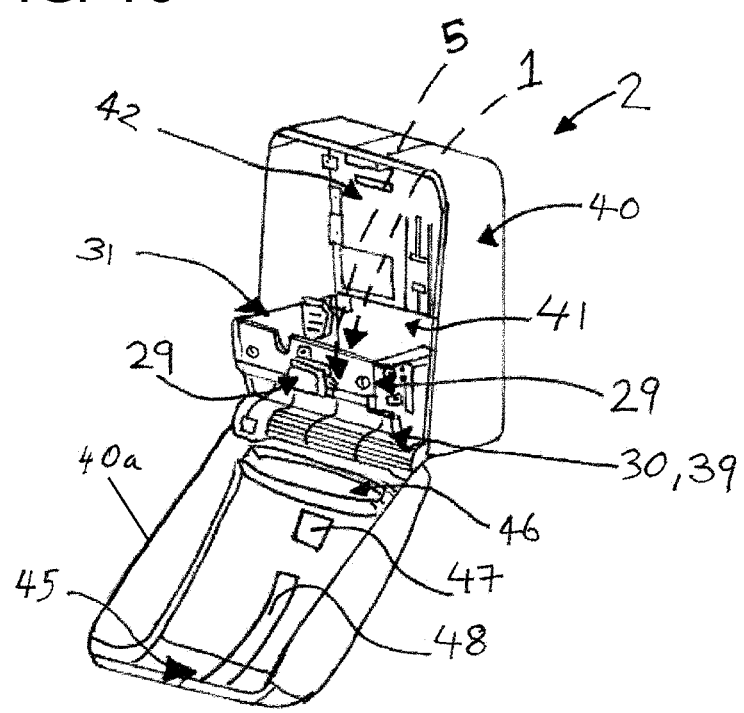

The feeding unit 30 includes a drive roller 39 for dispensing sheet material, wherein the drive roller is connected to the drive mechanism 27 and controlled by the control unit 29. The different parts for feeding the sheet material may be assembled in one unit as depicted in FIGS. 9 and 10. However, other solutions are possible where the parts are connected to each other via connecting means. Many different solutions are known per se in prior art and will not here be discussed in detail.

FIG. 10 shows a dispenser 26 for hygiene articles including a battery compartment 1 according to any one of FIGS. 1-6 or a dispensing unit 2 according to any one of FIGS. 7-9. The dispenser includes a second housing portion 40 including a hygiene article compartment 41 for storing hygiene articles.

FIG. 10 shows that the first housing portion 31 and the second housing portion 40 are connected to each other forming a continuous dispenser housing 42. FIG. 10 shows that the second housing portion includes also a door cover 40*a* that can be opened for access to the battery compartment 1 and the hygiene article compartment 41. The door cover 40*a* may be rotatably hinged to the housing portion 40, but may also be a separate unit that is attached to the housing portion 40. The door cover 40*a* may also be locked to the housing portion 40 via locking means 45. FIG. 10 shows that the door cover 40*a* includes a dispensing opening 46 through which the feeding unit 30 can dispense sheet material. The door cover 40*a* also includes a control window 47 through which the control unit 29 can be accessed and/or through which the visible means 44 can be displayed. The door cover 40*a* also includes an inspection window 48 through which the amount of sheet material can be inspected. It should be noted that in another example, not shown, the door cover does not include the dispensing opening and/or not the control window 47 and/or not inspection window 48.

Access to the battery compartment 1 is possible only when the dispenser housing 42 is open in order to avoid easy theft of the batteries. According to one example (not shown), the battery compartment 1 is connected to and part of the dispenser housing 42 such that at least a part of the battery compartment 1 is accessible from the outside of the dispenser housing 42. According to one example, when the battery compartment 1 is accessible from the outside, the battery compartment 1 includes a lock for locking the battery compartment 1 and thereby hindering access to the battery compartment. One advantage is that easy theft of the batteries is hindered.

In the closed position, the battery holding unit 5 and thus the fixed second structure 6 is held in place by a locking mechanism 43. The locking mechanism 43 has a first locking portion 43*a* in the battery holding unit 5 and a second locking portion 43 in connection to the fixed first structure 4. The second locking portion 43*b* is either part of the fixed first structure 4 or part of a different portion of the dispensing unit 2 being secured in fixed relationship to the fixed first structure 4. According to one example, the locking mechanism 43 includes audible means for producing an audible sound that tells the user closing the battery compartment that the battery holding unit is secured in place in the closed position. Such audible means are known per se for a person skilled in the art and may be in the form of a resilient member that snaps into position with an audible click. The first locking portion 43 According to another example, partly shown in FIG. 9, the battery box 1 includes visible means 44 that lights up when the batteries are connected, i.e. when the battery holding unit is in the closed position. The visible means 44 may be an integral part of the battery box or may be connected to a visible device in the dispensing unit and/or the dispenser.

Figure 11:
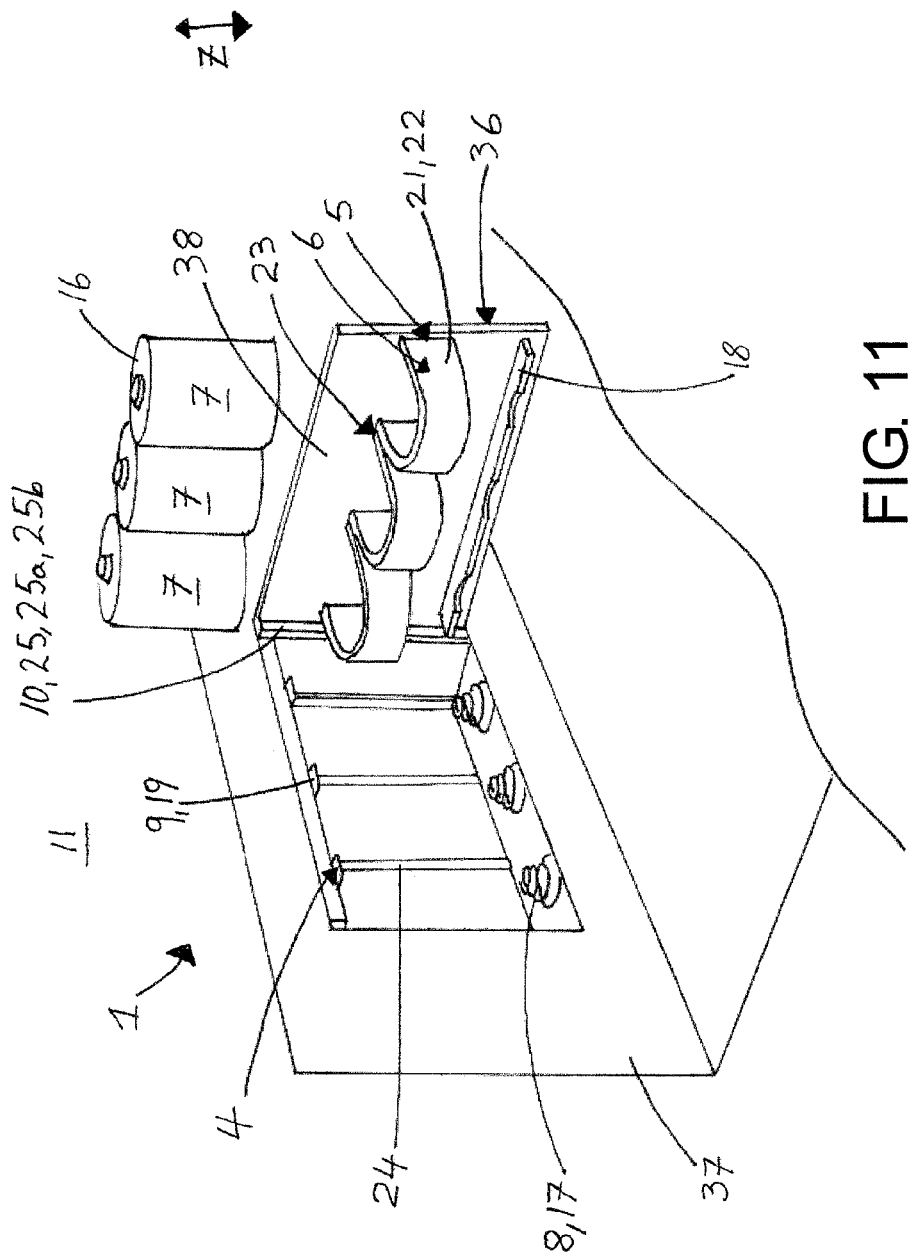
FIG. 11 schematically shows a perspective view of a battery compartment according to FIGS. 1-10, but with different orientation of batteries.

FIG. 11 schematically shows a perspective view of a battery compartment 1 according to FIGS. 1-10, but with different orientation of the batteries 7 in relation to the orientation of the joint 10. In FIG. 11 all features described in FIGS. 1-10 with reference to the battery compartment 1 and the battery holding unit 5 have the same denotation and refers to the same features in FIG. 11. However, in FIG. 11 the second structure 6 is arranged with a 90° rotation compared to in FIGS. 1-10 with relation to the joint 10. This means that in FIG. 11 the loading direction of the batteries 7 coincides with the orientation of the axis of the joint 10, i.e. in the longitudinal direction Z.

With reference to FIGS. 1-11, the dispensing unit 2 includes a drive mechanism 27 including an electric motor 28 connected to and driven by the batteries 7. The dispensing unit 2 includes a control unit 29 for controlling the drive mechanism 27. The dispensing unit 2 includes a feeding unit 30 connected to the driving mechanism 27 for dispensing a hygiene article. The dispensing unit 2 includes a first housing portion 31 having a bottom portion 32 and four side walls 33*a*, 33*b*, 33*c*, 33*d* forming a compartment 34. The battery holding unit 5 includes a lid 35 with an upper surface 36 facing away from the second structure 6. The upper surface 36 of the lid 35 is arranged with relation to the joint 10 to, in the closed position, lay flush with an upper surface 37 of the bottom portion 32, as shown in FIGS. 1-11. It should be noted that in FIG. 11 the bottom portion 32 is mounted on a house wall which means that the rotational axis, i.e. in the longitudinal direction Z, of the joint 10 coincide with the direction of gravity and with the loading direction. However, in another example, not shown, FIG. 11 could show the battery compartment 1 arranged in any one of the side walls 33*a*, 33*b*, 33*c*, 33*d* wherein the rotational axis of the joint 10, i.e. in the longitudinal direction Z, coincide with the direction of gravity and with the loading direction.

The invention claimed is:

1. A battery compartment for an electronically driven dispensing unit comprising:
    an electronic unit comprising:
        a fixed first structure, the first structure comprising, for each of at least two cylindrical batteries, a first electrical connection and a second electrical connection positioned opposite each other, the first electrical connections being arranged on a first side of the battery compartment and the second electrical connections being arranged on a second side opposite the first side of the battery compartment; and
        an electrical bridge extending between the first and second electrical connections for serial connection of the at least two cylindrical batteries; and
    a battery receptacle comprising:
        a fixed second structure adapted to receive the at least two cylindrical batteries side by side in an axial direction of the batteries and adapted to contain movement of the batteries in a radial direction of the batteries; and
        a protrusion for each battery on which a bottom portion of the battery is arranged to rest in a first open position,
    wherein the first structure is adapted to receive the second structure and the batteries for connection with the first and second electrical connections,
    wherein the second structure is rotatably connected to the first structure via a joint allowing rotation between the first open position in which the batteries are loaded or unloaded in the battery receptacle and a closed position in which loaded batteries are connected to the first and second electrical connections via spring action and movement of the batteries in the axial direction, and
    wherein the first and second electrical connections and protrusions are arranged such that, when the at least two cylindrical batteries are contained in the second structure and the battery receptacle is in a closed position, the at least two cylindrical batteries are suspended between the first and second electrical connections at a distance from the protrusions.

2. The battery compartment according to claim 1 wherein in a second open position, between the first open position and the closed position, the bottom portion is in contact with the first electrical connection,
    wherein in a third open position, between the second open position and the closed position, a top portion of the battery is in contact with the second electrical connection, and
    wherein the batteries are subject to spring forces between the first and second electrical connections during rotational movement of the second structure between the third open position and the closed position.

3. The battery compartment according to claim 2, wherein each of the first electrical connections further comprises a spring exerting a force on the bottom portion of the battery causing the battery to move in the axial direction in a direction away from the protrusion during rotational movement from the second open position to the third open position.

4. The battery compartment according to claim 2, wherein the second electrical connection further comprises an inclined surface on which the top portion of the battery rides during the rotation from the third open position to the closed position, wherein the inclined surface increasingly exerts a force on the battery causing the battery to move in the axial direction in a direction towards the protrusion during rotational movement from the third open position to a fourth open position, between the third open position and the closed position, or during rotational movement from the third open position to the closed position.

5. The battery compartment according to claim 1, wherein the joint has a rotational axis in a longitudinal direction, wherein the axial direction is perpendicular or parallel to the longitudinal direction.

6. The battery compartment according to claim 1, wherein the fixed second structure further comprises an enclosing structure allowing loading and unloading movement of the batteries in the axial direction and is adapted to contain the batteries in the radial direction.

7. The battery compartment according to claim 6, wherein the enclosing structure comprises one enclosing unit per battery that separates the batteries; and a gap between the enclosing units, wherein the electrical bridge is positioned in the gap in the closed position.

8. The battery compartment according to claim 1, wherein the at least two cylindrical batteries are separated from connection with the first electrical connections in the first open position.

9. The battery compartment according to claim 1, wherein the first electrical connections are arranged for connection with the minus pole of each of the at least two cylindrical batteries.

10. The battery compartment according to claim 9, wherein the second electrical connections are arranged for connection with the plus pole of each of the at least two cylindrical batteries.

11. The battery compartment according to claim 1, wherein the battery receptacle is arranged such that gravity holds the at least two cylindrical batteries in place in the axial direction when the battery receptacle is in the open position(s).

12. A dispensing unit comprising:
    an electronically driven paper dispensing unit; and
    a battery compartment comprising:
        an electronic unit comprising:
            a fixed first structure, the first structure comprising, for each of at least two cylindrical batteries, a first electrical connection and a second electrical connection positioned opposite each other, the first electrical connections being arranged on a first side of the battery compartment and the second electrical connections being arranged on a second side opposite the first side of the battery compartment; and
            an electrical bridge extending between the first and second electrical connections for serial connection of the at least two cylindrical batteries; and
        a battery receptacle having a fixed second structure adapted to receive the at least two cylindrical batteries side by side in an axial direction of the batteries and adapted to contain movement of the batteries in a radial direction,
    wherein the first structure is adapted to receive the second structure and the batteries for connection with the first and second electrical connections, and
    wherein the second structure is rotatably connected to the first structure via a joint allowing rotation between a first open position in which the batteries are loaded or unloaded in the battery receptacle and a closed position in which loaded batteries are connected to the first and second electrical connections via spring action and movement of the batteries in the axial direction.

13. The dispensing unit according to claim 12, wherein the dispensing unit is an insert for a dispenser.

14. A dispensing unit comprising:
   a drive mechanism comprising an electric motor connected to and driven by the at least two cylindrical batteries;
   a control unit for controlling the drive mechanism;
   a feeding unit connected to the driving mechanism for dispensing a hygiene article;
   a first housing portion having a bottom portion and four side walls forming a compartment; and
   a battery compartment comprising:
      an electronic unit comprising:
         a fixed first structure, the first structure comprising, for each of at least two cylindrical batteries, a first electrical connection and a second electrical connection positioned opposite each other, the first electrical connections being arranged on a first side of the battery compartment and the second electrical connections being arranged on a second side opposite the first side of the battery compartment; and
         an electrical bridge extending between the first and second electrical connections for serial connection of the at least two cylindrical batteries; and
      a battery receptacle comprising:
         a fixed second structure adapted to receive the at least two cylindrical batteries side by side in an axial direction of the batteries and adapted to contain movement of the batteries in a radial direction; and
         a lid with an upper surface facing away from the second structure,
   wherein the first structure is adapted to receive the second structure and the batteries for connection with the first and second electrical connections,
   wherein the battery receptacle is rotatably connected to the electronic unit via joint allowing rotation between a first open position in which the batteries are loaded or unloaded in the battery receptacle and a closed position in which loaded batteries are connected to the first and second electrical connections via spring action and movement of the batteries in the axial direction, and
   wherein the upper surface of the lid is arranged with relation to the joint to, in the closed position, lay flush with an upper surface of the bottom portion or any one of the side walls.

15. The dispensing unit according to claim 14, wherein the joint is positioned at an underside of the lid and below the upper surface of the bottom portion.

16. The dispensing unit according to claim 15, wherein the second structure is directly attached to the underside of the lid.

17. The dispensing unit according to claim 14, wherein the feeding unit comprises a drive roller for dispensing sheet material, wherein the drive roller is connected to the drive mechanism and controlled by the control unit.

18. A dispenser for hygiene articles comprising:
   the dispensing unit according to claim 14; and
   a second housing portion comprising a hygiene article compartment for storing hygiene articles.

19. The dispenser according to claim 18, wherein the first housing portion and the second housing portion are connected to each other forming a continuous dispenser housing.

20. The dispenser according to claim 18, wherein access to the battery compartment is possible only when the dispenser housing is open.

* * * * *